US009961331B2

(12) United States Patent
Ito

(10) Patent No.: US 9,961,331 B2
(45) Date of Patent: May 1, 2018

(54) ELECTRO-OPTIC APPARATUS AND ELECTRONIC APPARATUS

(71) Applicant: SEIKO EPSON CORPORATIOn, Tokyo (JP)

(72) Inventor: Akihiko Ito, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 63 days.

(21) Appl. No.: 14/797,070

(22) Filed: Jul. 10, 2015

(65) Prior Publication Data

US 2015/0319428 A1     Nov. 5, 2015

Related U.S. Application Data

(63) Continuation of application No. 13/592,484, filed on Aug. 23, 2012, now Pat. No. 9,113,159.

(30) Foreign Application Priority Data

Aug. 24, 2011    (JP) ................................ 2011-182293

(51) Int. Cl.
    *G09G 3/36*          (2006.01)
    *H04N 13/04*       (2006.01)

(52) U.S. Cl.
    CPC ....... *H04N 13/0438* (2013.01); *G09G 3/3607* (2013.01); *G09G 3/3614* (2013.01); *G09G 3/3677* (2013.01); *G09G 3/3696* (2013.01); *H04N 13/0459* (2013.01); *H04N 13/0497* (2013.01); *G09G 2310/0213* (2013.01)

(58) Field of Classification Search
None
See application file for complete search history.

(56) References Cited

U.S. PATENT DOCUMENTS

| 2006/0125942 | A1 | 6/2006 | Hosaka et al. |
| 2010/0253668 | A1 | 10/2010 | Sugihara et al. |
| 2010/0295837 | A1 | 11/2010 | Yoshinaga et al. |
| 2011/0292172 | A1 | 12/2011 | Harada |
| 2012/0146994 | A1 | 6/2012 | Jeong et al. |

FOREIGN PATENT DOCUMENTS

| JP | 64-055999 A | 3/1989 |
| JP | 04-063332 A | 2/1992 |
| JP | 08-043790 A | 2/1996 |
| JP | 2009-025436 A | 2/2009 |
| JP | 2010-271366 A | 12/2010 |

*Primary Examiner* — Seokyun Moon
(74) *Attorney, Agent, or Firm* — Maschoff Brennan

(57) ABSTRACT

A driving circuit perform first driving in which, in a first write period, a grayscale potential in an odd-numbered row is supplied to the pixels of a first group and, in a second write period, the grayscale potential is supplied to the pixels in an even-numbered row, and can perform second driving in which, in the first write period, the grayscale potential in the even-numbered row is supplied to the pixels of a second group and, in the second write period, the grayscale potential is supplied to the pixels in the odd-numbered row. In a right eye display period, the first driving is performed in a unit period U1 and the second driving is performed in a unit period U2. In a left eye display period, the second driving is performed in the unit period U1 and the first driving is performed in the unit period U2.

8 Claims, 9 Drawing Sheets

ELECTRO-OPTIC APPARATUS AND ELECTRONIC APPARATUS

RELATED APPLICATIONS

This application is a continuation of U.S. patent application Ser. No. 13/592,484, filed Aug. 23, 2012 which claims priority to Japanese Patent Application No. 2011-182293 filed Aug. 24, 2011. The foregoing patent applications are incorporated herein by reference.

BACKGROUND

1. Technical Field

The present invention relates to a technology which displays a right eye image and a left eye image to which parallax is mutually applied such that an observer perceives a stereoscopic effect.

2. Related Art

A stereoscopic method using a frame sequential method of alternately displaying a right eye image and a left eye image in a time division manner has been proposed from the related art. In a period during which one of the right eye image and the left eye image is changed to the other, the right eye image and the left eye image are mixed, so that it is difficult for an observer to recognize a definite stereoscopic effect when the observer views the image (crosstalk). In order to solve the above-described problem, for example, JP-A-2009-25436 discloses a technology for causing both the right eye shutter and the left eye shutter of a stereoscopic eyeglasses to be in a closed state so that an observer does not view an image in the period during which one of the right eye image and the left eye image is changed to the other (that is, in the period during which the right eye image and the left eye image are mixed).

As shown in detail in FIG. 12, a right eye display period corresponding to the right eye image and a left eye display period corresponding to the left eye image are alternately set. A display image is updated from the left eye image to the right eye image in the first half period of the right eye display period and the right eye image is displayed in the latter half period. The display image is updated from the right eye image to the left eye image in the first half period of the left eye display period and the left eye image is displayed in the latter half period. In the first half period of each of the right eye display periods and the left eye display periods, control is performed such that both the right eye shutter and the left eye shutter are in a closed state. Accordingly, the mixture of the right eye image and the left eye image (crosstalk) is not perceived by the observer.

However, under the technology disclosed in JP-A-2009-25436, a period during which the observer can actually view an image is limited to the latter half period (that is, about half) of each of the right eye display periods and the left eye display periods. Accordingly, there is a problem in that it is difficult to sufficiently secure the brightness of the display image.

SUMMARY

An advantage of some aspects of the invention is to improve the brightness of a display image while restraining an observer from perceiving the mixture of a right eye image and a left eye image.

According to a first aspect of the invention, there is provided an electro-optic apparatus which alternately displays a right eye image and a left eye image in every display period, the electro-optic apparatus including: a plurality of scan lines in which first scan lines and second scan lines are alternately arranged; a plurality of signal lines which intersect the plurality of scan lines; a plurality of pixels which are arranged to correspond to the intersections of the plurality of scan lines and the plurality of signal lines; and a driving circuit which drives each of the plurality of pixels. The driving circuit can perform a first driving in which, in a first write period, a first group obtained by dividing the plurality of scan lines into two scan lines which are adjacent to each other is sequentially selected, and a grayscale potential based on the designated grayscale of each of the pixels corresponding to a first scan line of the first group in a selection state is supplied to each of the signal lines, and, in a second write period after the first write period has elapsed, each of second scan lines is sequentially selected, and a grayscale potential, based on the designated grayscale of each of the pixels corresponding to each of the second scan lines in the selection state, is supplied to each of the signal lines. The driving circuit can perform a second driving in which, in the first write period, a second group obtained by dividing the plurality of scan lines into two scan lines which are adjacent to each other using different combination from that of the first group is sequentially selected, and a grayscale potential based on the designated grayscale of each of the pixels corresponding to a second scan line of the second group in the selection state is supplied to each of the signal lines, and, in the second write period, each of first scan lines is sequentially selected, and a grayscale potential based on the designated grayscale of each of the pixels corresponding to each of the first scan lines in the selection state is supplied to each of the signal lines. The driving circuit performs the first driving in a first unit period of the display period of the right eye image, performs the second driving in a second unit period, after the first unit period has elapsed, of the display period, performs the second driving in the first unit period of the display period of the left eye image, and performs the first driving in the second unit period of the display period.

In the above-described configuration, in the first write period of the first unit period of each display period, two scan lines are sequentially selected and the grayscale potential is supplied to each of the pixels. Therefore, compared to the configuration in which, in each display period, a single scan line is sequentially selected and the grayscale potential is supplied to each of the pixels, the duration of the period during which the right eye image and the left eye image are mixed is reduced. Accordingly, when control is performed such that both the right eye shutter and the left eye shutter of the stereoscopic eyeglasses is in the closed state in the period during which the right eye image and the left eye image are mixed, it is possible to improve the brightness of the display image even when an observer is restrained from perceiving the mixture of the right eye image and the left eye image. In addition, the relationship between the first unit period/the second unit period and the first driving/the second driving is reversed in the display period of the right eye image and the display period of the left eye image. Therefore, the bias of the polarity of a voltage applied to each pixel is offset in the display period of the right eye image and the display period of the left eye image. Accordingly, it is possible to restrain the deterioration in the pixel characteristics due to the application of direct current components.

In the electro-optic apparatus according to the first aspect, the driving circuit, in the first control period of a plurality of control periods each of which includes the display period of the right eye image and the display period of the left eye image, may perform the first driving in the first unit period of the display period of the right eye image and may perform the second driving in the second unit period of the corresponding display period, and may perform the second driving in the first unit period of the display period of the left eye image and may perform the first driving in the second unit period of the corresponding display period, and the driving circuit, in the second control period, which is different from the first control period, of the plurality of control periods, may perform the second driving in the first unit period of the display period of the right eye image and may perform the first driving in the second unit period of the corresponding display period, and may perform the first driving in the first unit period of the display period of the left eye image and may perform the second driving in the second unit period of the corresponding display period. In the above aspect, the relationship between the first unit period/the second unit period and the first driving/the second driving is reversed in the first control period and the second control period. Therefore, the above-described effect in that it is possible to restrain the deterioration in the pixel characteristics due to the bias (the residue of the direct current components) of the polarity of the voltage applied to the pixel is especially remarkable.

According to a second aspect of the invention, there is provided an electro-optic apparatus which alternately displays a right eye image and a left eye image in every display period, the electro-optic apparatus including: a plurality of scan lines in which a first scan line and a second scan line are alternately arranged; a plurality of signal lines which intersect the plurality of scan lines; a plurality of pixels which are arranged to correspond to the intersections of the plurality of scan lines and the plurality of signal lines; and a driving circuit which drives each of the plurality of pixels. The driving circuit can perform a first driving in which, in a first write period, a first group obtained by dividing the plurality of scan lines into two scan lines, which are adjacent to each other, is sequentially selected, and a grayscale potential based on the designated grayscale of each of the pixels corresponding to the first scan line of the first group in a selection state is supplied to each of the signal lines, and, in a second write period after the first write period has elapsed, each of the second scan lines is sequentially selected, and a grayscale potential, based on the designated grayscale of each of the pixels corresponding to the second scan line in the selection state, is supplied to each of the signal lines. The driving circuit can perform a second driving in which, in the first write period, a second group obtained by dividing the plurality of scan lines into two scan lines which are adjacent to each other using a different combination from that of the first group is sequentially selected, and a grayscale potential based on the designated grayscale of each of the pixels corresponding to the second scan line of the second group in the selection state is supplied to each of the signal lines, and, in the second write period, each of the first scan lines is sequentially selected, and a grayscale potential based on the designated grayscale of each of the pixels corresponding to the first scan line in the selection state is supplied to each of the signal lines. In each display period of the first control period of the plurality of control periods each of which includes the display period of the right eye image and the display period of the left eye image, the first driving is performed in the first unit period and the second driving is performed in second unit period. Further, in the second control period, which is different from the first control period, of the plurality of control periods, the second driving is performed in the first unit period and the first driving is performed in the second unit period. In the above-described configuration, the same operation and effect as in the electro-optic apparatus according to the first aspect is implemented.

In the electro-optic apparatus according to the first aspect and the second aspect, the driving circuit may set the polarity of the grayscale potential with respect to a reference potential to a first polarity in the first write period and the second write period of the first unit period of each display period, and may set the polarity of the grayscale potential with respect to the reference potential to a second polarity which is reverse to the first polarity in the first write period and the second write period of the second unit period of each display period. In the above-described configuration, the polarity of the grayscale potential is reversed in every unit period. Therefore, for example, compared to the configuration in which the polarity of the grayscale potential is reversed in every display period, the period during which the polarity of the grayscale potential is reversed is reduced. Accordingly, there is an advantage in that it is difficult for an observer to perceive the variation in the display grayscale (flickering) attributable to the difference in the polarity of the grayscale potential.

In the electro-optic apparatus according to the first aspect and the second aspect, the electro-optic apparatus may further include: stereoscopic eyeglasses which includes a right eye shutter and a left eye shutter, and displays the right eye image and the left eye image which are stereoscopically viewed; and an eyeglass control circuit which performs control such that both the right eye shutter and the left eye shutter are in a closed state for at least a part of the first write period of the first unit period of each display period, performs control such that the right eye shutter is in an open state and the left eye shutter is in the closed state for at least a part of the second write period of the first unit period of the display period of the right eye image and the first write period and the second write period of the second unit period, and performs control such that the left eye shutter is in the open state and the right eye shutter is in the closed state for at least a part of the second write period of the first unit period of the display period of the left eye image and the first write period and the second write period of the second unit period.

In addition, when the number of scan lines which are included in the first group and the second group is generalized as Q, the driving circuit may be implemented as an element which can perform first driving in which, in a first write period, a first group obtained by dividing the plurality of scan lines into Q scan lines which are adjacent to each other (Q is a natural number which is equal to or greater than 2) is sequentially selected, and a grayscale potential, based on the designated grayscale of each of the pixels corresponding to the first scan line of the first group in a selection state, is supplied to each of the signal lines, and in each q-th write period (q=2 to Q) after the first write period has elapsed, the grayscale potential, based on the designated grayscale of each of the pixels corresponding to the q-th scan line of each first group, is supplied to each of the signal lines, and which can perform second driving in which, in the first write period, a second group obtained by dividing the plurality of scan lines into Q scan lines which are adjacent to each other using a combination, which is different from that of the first group, is sequentially selected, and a grayscale potential, based on the designated grayscale of each of the pixels corresponding to the first scan line of the second group in the selection state, is supplied to each of the signal lines, and, in each q-th write period, the grayscale potential, based on the designated grayscale of each of the pixels corresponding to the q-th scan line of each second group, is supplied to each of the signal lines.

The electro-optic apparatus according to each of the above-described aspects is used in various types of electronic apparatuses as a display apparatus. For example, a stereoscopic display apparatus, which includes an electro-optic apparatus and the stereoscopic eyeglasses controlled using the eyeglass control circuit according to each of the above-described aspects, is exemplified as the electronic apparatus according to the aspects of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
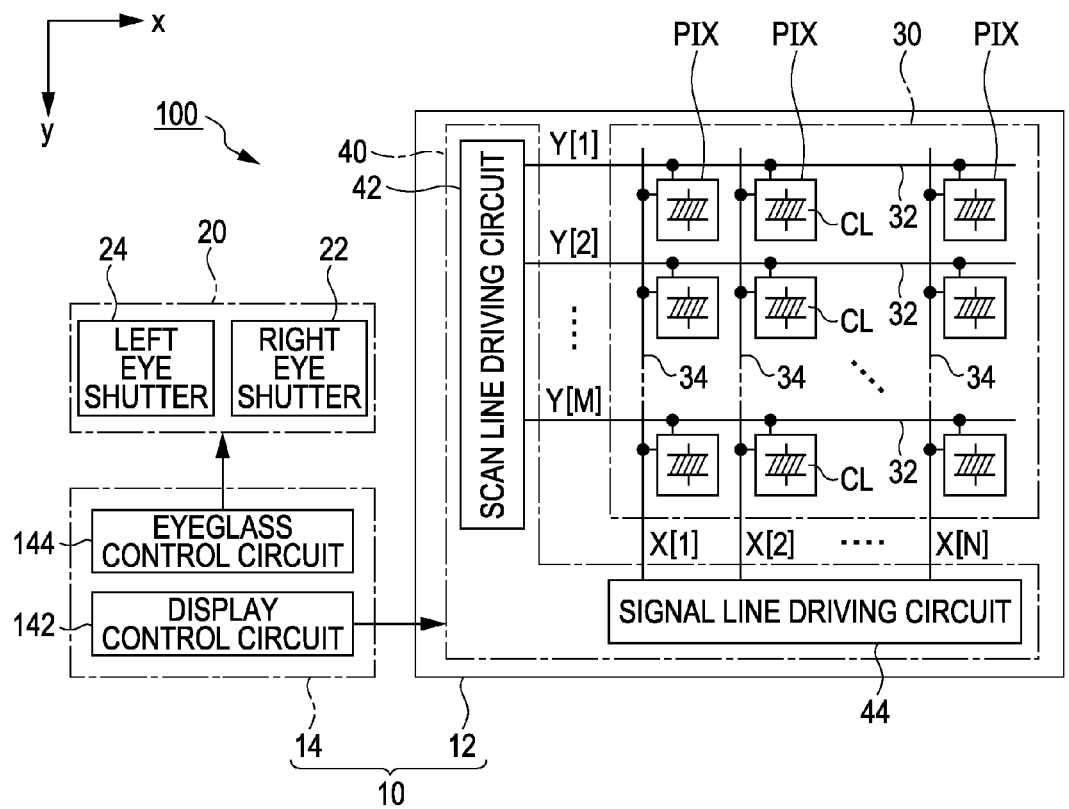
FIG. 1 is a block diagram illustrating a stereoscopic display apparatus according to a first embodiment of the invention.

FIG. 1 is a block diagram illustrating a stereoscopic display apparatus 100 according to a first embodiment of the invention. The stereoscopic display apparatus 100 is an electronic apparatus which displays a stereoscopic image, the stereoscopic effect of which is perceived by an observer, using an active shutter method, and includes an electro-optic apparatus 10 and stereoscopic eyeglasses 20. The electro-optic apparatus 10 alternately displays a right eye image GR and a left eye image GL, to which parallax is mutually applied, in a time division manner. In addition, as described below, there is a case in which the right eye image GR and the left eye image GL are comprehensively expressed as a pixel Gi (i=R, L).

The stereoscopic eyeglasses 20 are an eyeglass-type apparatus which is worn by an observer when a stereoscopic image displayed using the electro-optic apparatus 10 is viewed, and includes a right eye shutter 22 located in front of the right eye of the observer and a left eye shutter 24 located in front of the left eye. Each of the right eye shutter 22 and the left eye shutter 24 is controlled such that each of the right eye shutter 22 and the left eye shutter 24 is in an open state (transmission state) in which irradiation light is transmitted or in a closed state (light interception state) in which irradiation light is intercepted. For example, a liquid crystal shutter, the state of which varies from one of the open state and the closed state to the other state by varying the orientation direction of liquid crystals based on an applied voltage, may be used for the right eye shutter 22 and the left eye shutter 24.

The electro-optic apparatus 10 shown in FIG. 1 includes an electro-optic panel 12 and a control circuit 14. The electro-optic panel 12 includes a pixel section 30 in which a plurality of pixels (pixel circuits) PIX are arranged, and a driving circuit 40 which drives each of the pixels PIX. The pixel section 30 is formed with M scan lines 32 extended in the x direction and N signal lines 34 extended in the y direction which intersects the x direction (M and N are natural numbers). The plurality of pixels PIX in the pixel section 30 are arranged in a vertical M row×horizontal N column matrix while corresponding to the respective intersections of the scan lines 32 and the signal lines 34.

Figure 2:
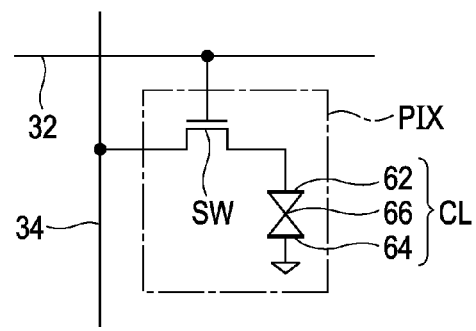
FIG. 2 is a circuit diagram illustrating a pixel circuit.

FIG. 2 is a circuit diagram of each pixel PIX. As shown in FIG. 2, each pixel PIX includes a liquid crystal element CL and a selection switch SW. The liquid crystal element CL is an electro-optic element configured with a pixel electrode 62 and a common electrode 64 which face each other, and liquid crystal 66 interposed between the both electrodes. The transmittance (display grayscale) of the liquid crystal 66 varies based on a voltage applied between the pixel electrode 62 and the common electrode 64. The selection switch SW is configured with an N-channel type thin film transistor, in which a gate is connected to the scan line 32, and is interposed between the liquid crystal element CL and the signal line 34 in order to control the electrical connection (conduction/insulation) therebetween. Meanwhile, a configuration in which a subsidiary capacity is connected in parallel to the liquid crystal element CL may be used.

The control circuit 14 shown in FIG. 1 includes a display control circuit 142 which controls the electro-optic panel 12, and an eyeglass control circuit 144 which controls the stereoscopic eyeglasses 20. In addition, a configuration in which the display control circuit 142 and the eyeglass control circuit 144 are installed in a stand-alone integrated circuit and a configuration in which the display control circuit 142 and the eyeglass control circuit 144 are dispersed in separate integrated circuits may be used. The display control circuit 142 controls the driving circuit 40 such that the right eye image GR and the left eye image GL, to which parallax is mutually applied, are displayed on the pixel section 30.

The driving circuit 40 is a circuit which supplies a grayscale potential X[n] (n=1 to N) to each pixel PIX according to a grayscale (hereinafter, refer to "a designated grayscale") which is designated to each pixel PIX using an image signal supplied from an external circuit, and includes a scan line driving circuit 42 and a signal line driving circuit 44. The scan line driving circuit 42 sequentially selects each of the scan lines 32 in such a way as to supply scan signals Y[1] to Y[M] corresponding to the respective scan lines 32. Each of the scan signals Y[m] (m=1 to M) is set to a predetermined selection potential (that is, an m-th row scan line 32 is selected), thus the selection switches SW of the respective pixels PIX included in the m-th row are switched on at the same time.

The signal line driving circuit 44 supplies grayscale potentials X[1] to X[N] to respective N signal lines 34 in synchronization with the selection of each scan line 32 using the scan line driving circuit 42. Each pixel PIX (the liquid crystal element CL) displays a grayscale based on the grayscale potential X[n] of the signal line 34 when the scan line 32 is selected (when control is performed such that the selection switch SW is in an on-state).

Figure 3:
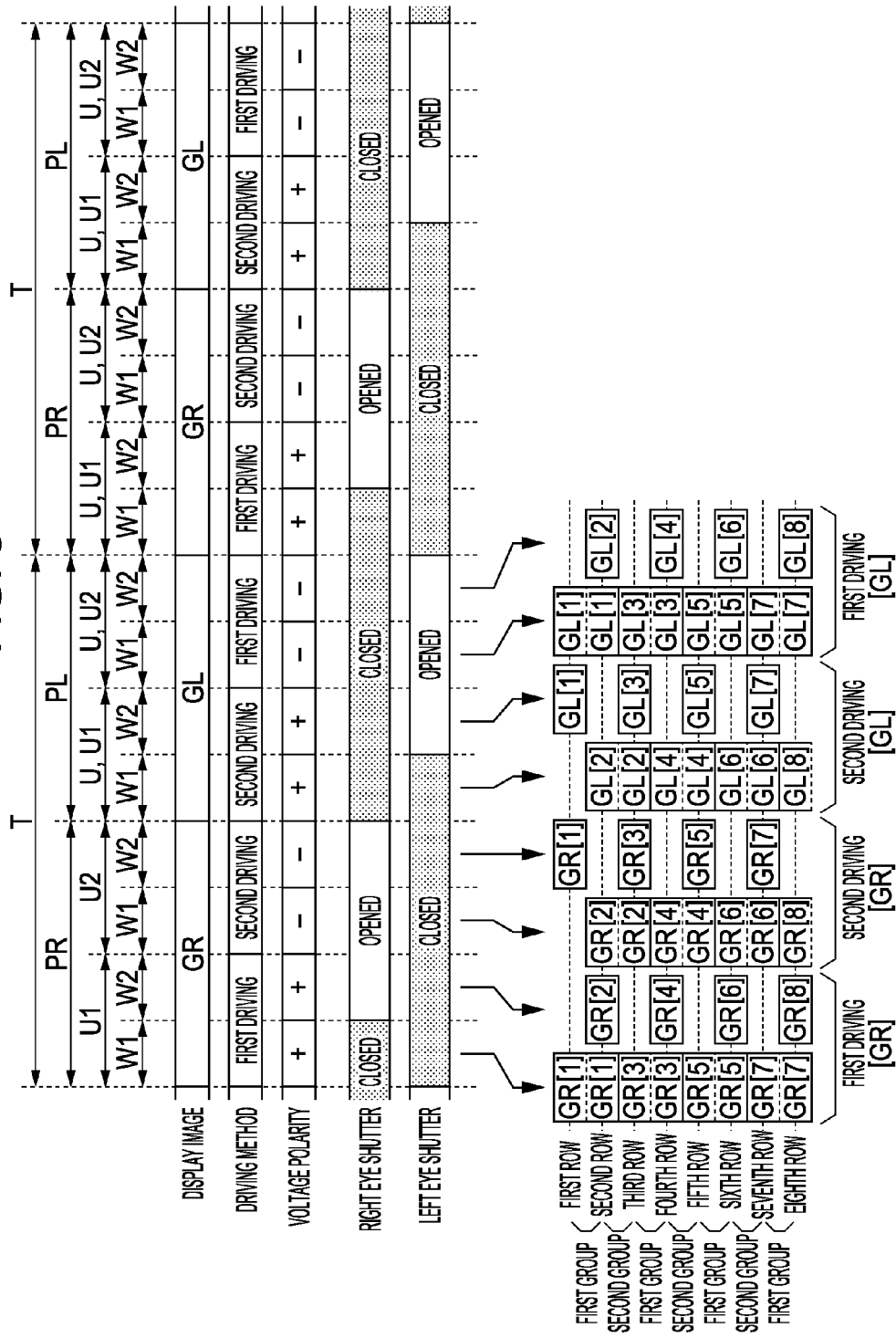
FIG. 3 is an explanatory diagram illustrating the operation of a stereoscopic display apparatus.

FIG. 3 is an explanatory diagram illustrating the operation of the electro-optic apparatus 10. As shown in FIG. 3, the operating period of the electro-optic apparatus 10 is divided into a plurality of control periods T. Each of the control periods T is divided into two predetermined-length display periods Pi (a right eye display period PR and a left eye display period PL). The right eye image GR is displayed on the pixel section 30 in the right eye display period PR, and the left eye image GL is displayed on the pixel section 30 in the left eye display period PL. The right eye display period PR and the left eye display period PL are alternately arranged on the time axis. That is, a single control period T is configured with the right eye display period PR and the left eye display period PL which occur one after another. Each display period Pi (PR, PL) is divided into two unit periods U (U1 and U2) which have time lengths which are equal to each other. The unit period U2 comes after the unit period U1. Each of the unit periods U (U1 and U2) includes a first write period W1 and a second write period W2. The second write period W2 comes after the first write period W1.

In the right eye display period PR, the signal line driving circuit 44 sequentially supplies grayscale potentials X[1] to X[N], based on the image signal of the right eye image GR, to the respective signal lines 34, in synchronization with the selection of the scan line 32 performed by the scan line driving circuit 42. In the left eye display period PL, the signal line driving circuit 44 sequentially supplies the grayscale potentials X[1] to X[N], based on the image signal of the left eye image GL, to the respective signal lines 34 in synchronization with the selection of the scan line 32 performed by the scan line driving circuit 42. The signal line driving circuit 44 reverses the polarity of each grayscale potential X[n] with respect to a predetermined reference potential in every unit period U such that the polarity of a voltage applied to the liquid crystal element CL of each pixel PIX is periodically reversed. In detail, the polarity of each grayscale potential X[n] is set to a positive polarity (+) in the unit period U1 of each display period P, and is set to a negative polarity (−) in the unit period U2 of each display period P, as shown in FIG. 3. In addition, since the grayscale potential X[n] is supplied to the pixel electrode 62 of the liquid crystal element CL, the polarity shown in FIG. 3 is considered to be the same as the polarity of a voltage applied to the liquid crystal element CL.

Figure 4:
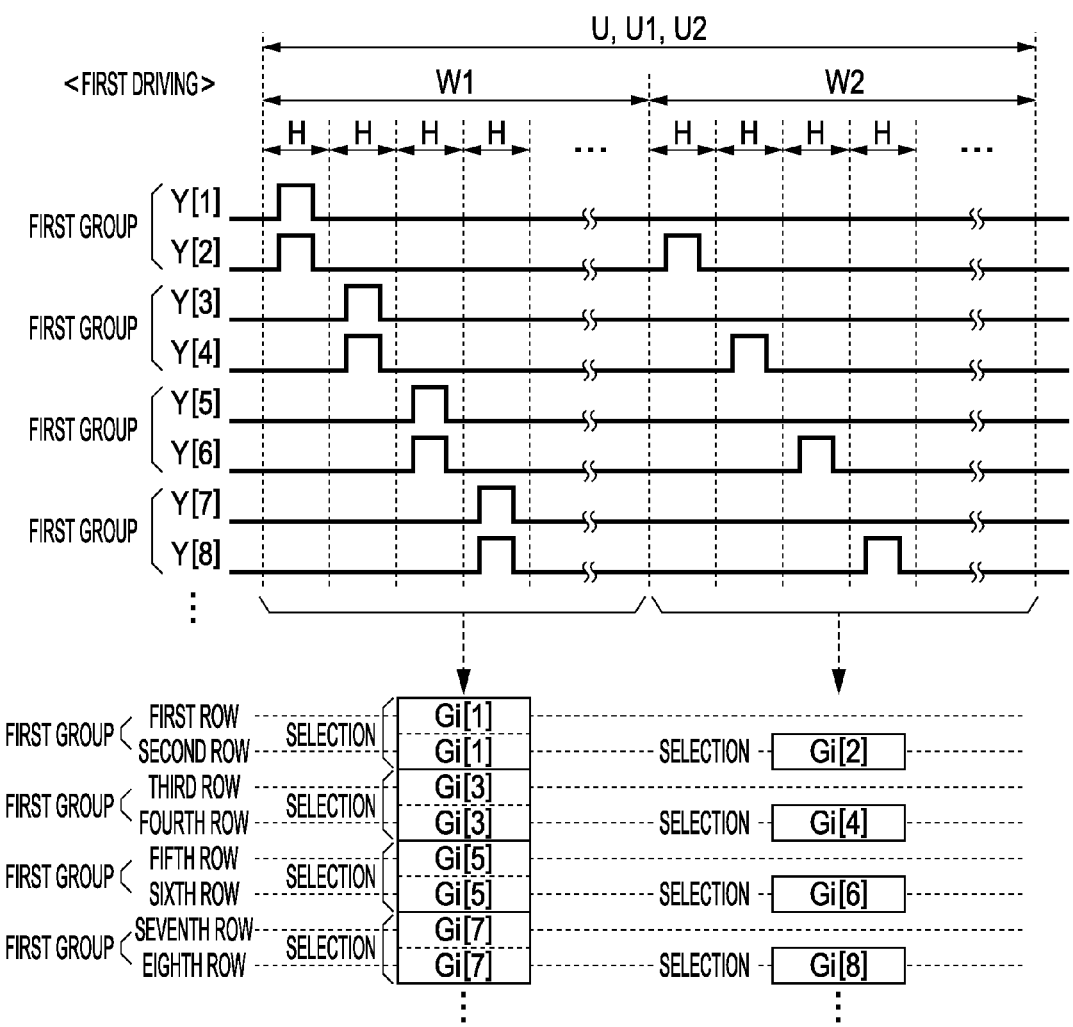
FIG. 4 is an explanatory diagram illustrating first driving.
Figure 5:
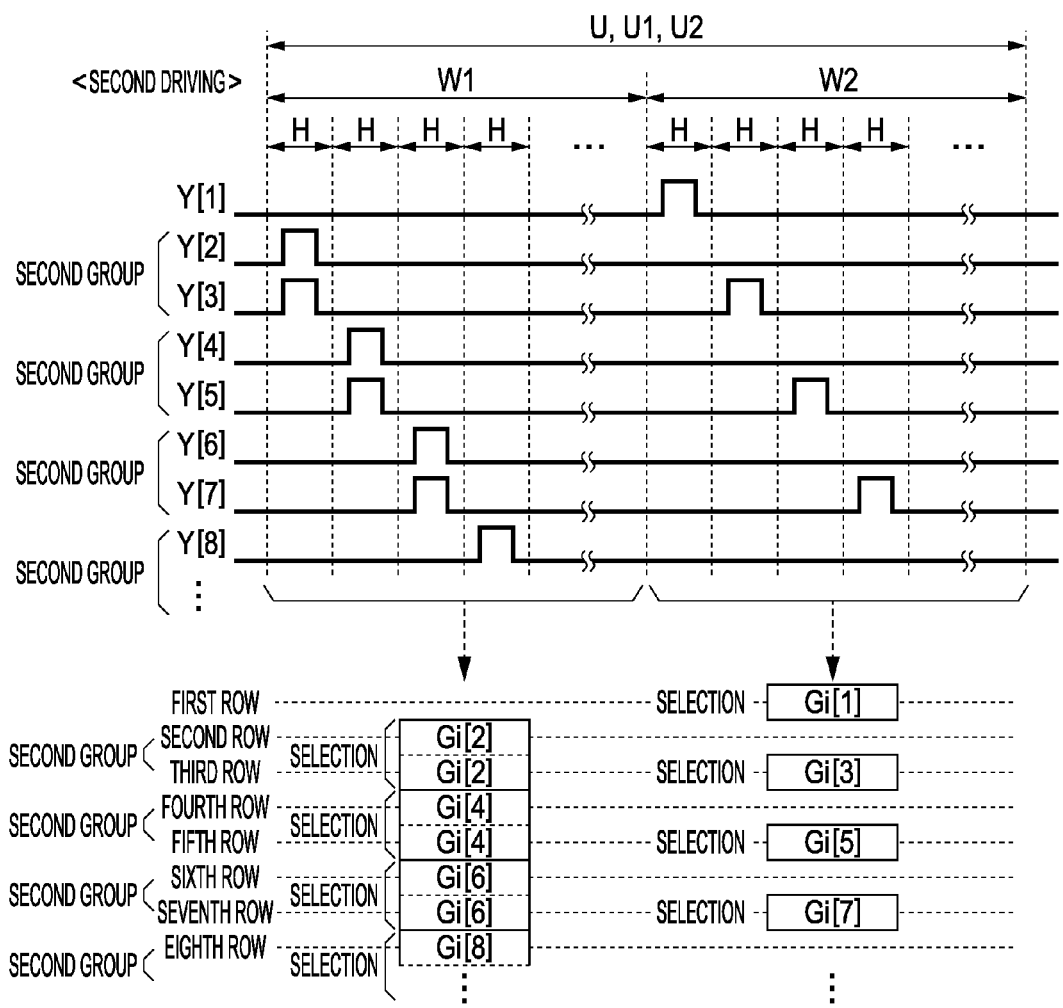
FIG. 5 is an explanatory diagram illustrating second driving.

The driving circuit 40 according to the first embodiment can selectively perform the first driving shown in FIG. 4 and the second driving shown in FIG. 5 in every unit period U of each display period Pi. The first driving is a driving method of considering each of a plurality of groups (hereinafter referred to as "first groups") obtained by dividing the M scan lines 32 into every two scan lines 32 which are adjacent to each other as a driving target, as shown in FIG. 4. Each of the first groups includes a single scan line 32 in an even-numbered row (2k-th row) and a single scan line 32 in an odd-numbered row ((2k−1)-th row) which is adjacent to the corresponding scan line 32 on the negative side of the Y direction. Meanwhile, the second driving is a driving method of considering each of a plurality of groups (hereinafter referred to as "second groups") obtained by dividing the M scan lines 32 into every two scan lines 32 which are adjacent to each other as a driving target using a group combination method which is different from that for the first groups, as shown in FIG. 5. Each of the second groups includes a single scan line 32 in an even-numbered row (2k-th row) and a single scan line 32 in an odd-numbered row ((2k+1)-th row) which is adjacent to the corresponding scan line 32 on the positive side of the Y direction. That is, the relationship between the first group and the second group is that there is only deviation in a single scan line 32 on the y direction. Each of the first driving and the second driving will be described in detail below.

First Driving

In the first driving, the driving circuit 40 uses a driving method of, in the first write period W1 of the unit period U, sequentially selecting the first groups and supplying the grayscale potential X[n], based on the designated grayscale of each of the pixels PIX corresponding to the odd-numbered row ((2k−1)-th row) scan line 32 of the first group in the selection state, to each of the signal lines 34, and, in the second write period W2 of the unit period U, sequentially selecting the scan line 32 in the even-numbered low (2k-th row) and supplying the grayscale potential X[n] to each of the signal lines 34 based on the designated grayscale of each of the pixels PIX corresponding to the scan line 32 in the selection state. The operations of the scan line driving circuit 42 and the signal line driving circuit 44 in the case in which the first driving is performed will be described in detail below.

As shown in FIG. 4, the scan line driving circuit 42 sequentially selects each of the first groups in every selection period H of the first write period W1. That is, the scan line driving circuit 42 sets the scan signal Y[2k−1] and the scan signal Y[2k] to selection potentials in the k-th selection period H of the first write period W1, thereby selecting two scan lines 32, that is, the (2k−1)-th row and 2k-th row scan lines 32, which are included in the first group at the same time. For example, in the first selection period H of the first write period W1, two scan lines 32, that is, the first row and the second row scan lines 32 are selected at the same time, and, in the second selection period H, two scan lines 32, that is, the third row and the fourth row scan lines 32 are selected at the same time.

In the selection period H, during which two scan lines 32, that is, the (2k−1)-th row and 2k-th row scan lines 32, which are included in the first group, of the first write period W1 of each unit period U of the display period Pi (PR, PL), the signal line driving circuit 44 supplies the grayscale potential X[n], based on the designated grayscale Gi[2k−1] of each of the pixels PIX in the (2k−1)-th row of an image Gi, to each signal line 34. For example, in the first selection period H of the first write period W1 of the right eye display period PR, the grayscale potential X[n], based on the designated grayscale GR[1] of each of the pixels PIX in the first row of the right eye image GR, is supplied to each signal line 34. Further, in the second selection period H, the grayscale potential X[n], based on the designated grayscale GR[3] of each of the pixels PIX in the third row of the right eye image GR, is supplied to each signal line 34. That is, in the k-th selection period H of the first write period W1, the grayscale potential X[n], based on the designated grayscale Gi[2k−1] in the (2k−1)-th row of the image Gi, is supplied to each of the pixels PIX in the (2k−1)-th row and the 2k-th row, as shown in FIG. 4. Accordingly, at a time point at which the first write period W1 is finished, the image Gi in which the resolution in the y direction is halved is displayed on the pixel section 30.

Meanwhile, in the second write period W2, the scan line driving circuit 42 sequentially selects each of the scan lines 32 in even-numbered rows in every selection period H, as shown in FIG. 4. That is, every M-th scan line 32 is selected. In detail, in the k-th selection period H of the second write period W2, the scan line driving circuit 42 sets a scan signal Y[2k] to the selection potential, thereby selecting a single scan line 32 in the 2k-th row, as shown in FIG. 4. That is, for example, in the first selection period H of the second write period W2, the scan line 32 in the second row is selected, and, in the second selection period H, the scan line 32 in the fourth row is selected. The scan lines 32 in the odd-numbered rows are not selected in the second write period W2.

In the selection period H, during which the single scan line 32 in the 2k-th row is selected, of the second write period W2, the signal line driving circuit 44 supplies the grayscale potential X[n], based on the designated grayscale Gi[2k] of each of the pixels PIX in the 2k-th row of the image Gi, to each signal line 34. For example, in the first selection period H of the second write period W2 of the right eye display period PR, the grayscale potential X[n], based on the designated grayscale GR[2] of each of the pixels PIX in the second row of the right eye image GR, is supplied to each signal line 34. Further, in the second selection period H, the grayscale potential X[n], based on the designated grayscale GR[4] of each of the pixels PIX in the fourth row of the right eye image GR, is supplied to each signal line 34. That is, in the k-th selection period H of the second write period W2, the grayscale potential X[n], based on the designated grayscale Gi[2k] in the 2k-th row of the image Gi, is supplied to each of the pixels PIX in the 2k-th row, as shown in FIG. 4. Meanwhile, a voltage applied to the liquid crystal element CL of each of the pixels PIX in an odd-numbered row is maintained at a setting voltage in the first write period W1 which is the immediately preceding second write period W2. Accordingly, at the end point of the first write period W1, the image Gi which is displayed with half resolution in the y direction is updated to the image Gi with the desired resolution (vertical M rows×horizontal N columns) at the end point of the second write period W2.

Second Driving

The second driving is a driving method of sequentially selecting the second groups and supplying the grayscale potential X[n], based on the designated grayscale of each of the pixels PIX corresponding to the scan line 32 in the even-numbered row (2k-th row) of the second group in the selection state, to each of the signal lines 34 in the first write period W1 of the unit period U, and of sequentially selecting the scan lines 32 in the odd-numbered rows ((2k+1)-th rows) and supplying the grayscale potential X[n], based on the designated grayscale of each of the pixels PIX corresponding to the scan line 32 in the selection state, to each of the signal lines 34 in the second write period W2 of the unit period U. The operations of the scan line driving circuit 42 and the signal line driving circuit 44 in the case in which the second driving is performed will be described in detail below.

As shown in FIG. 5, the scan line driving circuit 42 sequentially selects each of the second groups in every selection period H of the first write period W1. That is, the scan line driving circuit 42 sets the scan signal Y[2k] and the scan signal Y[2k+1] to selection potentials in the k-th selection period H of the first write period W1, thereby selecting two scan lines 32, which are located in the 2k-th row and the (2k+1)-th row and included in the second group, at the same time. For example, in the first selection period H of the first write period W1, the scan lines 32 in the second and third rows are selected at the same time, and in the second selection period H, the scan lines 32 in the fourth and fifth rows are selected at the same time.

In the selection period H, during which two scan lines 32 which are located in the 2k-th row and the (2k+1)-th row and included in the second group are selected, of the first write period W1 of each of the unit periods U of the display period Pi (PR, PL), the signal line driving circuit 44 supplies the grayscale potential X[n], based on the designated grayscale Gi[2k] in the 2k-th row of the image Gi, to each of the signal lines 34. Accordingly, in the k-th selection period H of the first write period W1, the grayscale potential X[n], based on the designated grayscale Gi[2k] in the 2k-th row of the image Gi, is commonly supplied to each of the pixels PIX in the 2k-th row and the (2k+1)-th row, as shown in FIG. 5. For example, in the first selection period H of the first write period W1 of the right eye display period PR, the grayscale potential X[n], based on the designated grayscale GR[2] of each of the pixels PIX in the second row of the right eye image GR is supplied to each of the pixels PIX in the second and third rows, and, in second selection period H, the grayscale potential X[n], based on the designated grayscale GR[4] of each of the pixels PIX in the fourth row of the right eye image GR is supplied to each of the pixels PIX in the fourth and fifth rows. Accordingly, at a time point at which the first write period W1 is finished, the image Gi in which the resolution in the y direction is halved is displayed on the pixel section 30.

Meanwhile, in the second write period W2, the scan line driving circuit 42 sequentially selects each of the scan lines 32 in the odd-numbered row in every selection period H. In detail, the scan line driving circuit 42 sets the scan signal Y[2k−1] to the selection potential in the k-th selection period H of the second write period W2, thereby selecting a single scan line 32 in the (2k−1)-th row, as shown in FIG. 5. That is, for example, in the first selection period H of the second write period W2, the scan line 32 in the first row is selected, and, in the second selection period H, the scan line 32 in the third row is selected. The scan lines 32 in the even-numbered rows are not selected in the second write period W2.

In the selection period H, during which a single scan line 32 in the (2k−1)-th row is selected, of the second write period W2, the signal line driving circuit 44 supplies the grayscale potential X[n], based on the designated grayscale Gi[2k−1] of each of the pixels PIX in the (2k−1)-th row of the image Gi, to each of the signal lines 34. Accordingly, in the k-th selection period H of the second write period W2, the grayscale potential X[n], based on the designated grayscale Gi[2k−1] in the (2k−1)-th row of the image Gi, is supplied to each of the pixels in the (2k−1)-th row, as shown in FIG. 5. For example, in the first selection period H of the second write period W2 of the right eye display period PR, the grayscale potential X[n], based on the designated grayscale GR[1] of each of the pixels PIX in the first row of the right eye image GR, is supplied to each of the pixels PIX in the first row. Further, in the second selection period H, the grayscale potential X[n], based on the designated grayscale GR[3] of each of the pixels PIX in the third row of the right eye image GR, is supplied to each of the pixels PIX in the third row. Accordingly, at the end point of the first write period W1, the image Gi which is displayed with half resolution in the y direction is updated to the image Gi with desired resolution (vertical M rows×horizontal N columns) at the end point of the second write period W2.

The first driving and the second driving have been described above. As shown in FIG. 3, the driving circuit 40 reverses the combination of the first driving/the second driving and the unit period U1/the unit period U2 in the right eye display period PR and the left eye display period PL. That is, the driving circuit 40 performs first driving in the unit period U1 of the right eye display period PR, performs second driving in the unit period U2, performs second driving in the unit period U1 of the left eye display period PL, and performs first driving in the unit period U2. In the first embodiment, since the polarity of the grayscale potential X[n] is reversed in every unit period U, it can be said that the relationship between the polarity of the grayscale potential X[n] (the polarity of the voltage applied to the liquid crystal element CL) and the first driving/second driving is reversed in the right eye display period PR and the left eye display period PL. That is, in the right eye display period PR, when the grayscale potential X[n] is a positive polarity (in the unit period U1), the first driving is performed. Further, when the grayscale potential X[n] is a negative polarity (in the unit period U2), the second driving is performed. In the left eye display period PL, when the grayscale potential X[n] is a positive polarity (in the unit period U1), the second driving is performed. Further, when the grayscale potential X[n] is a negative polarity (in the unit period U2), the first driving is performed.

As understood from the above description, in the first write period W1 of the unit period U1 of the right eye display period PR, the left eye image GL, which is displayed in the immediately preceding left eye display period PL, (the second write period W2 of the unit period U2) is sequentially updated to the right eye image GR in every first group (in every second row), and in the first write period W1 of the unit period U1 of the left eye display period PL, the right eye image GR, which is displayed in the immediately preceding right eye display period PR, (the second write period W2 of the unit period U2) is sequentially updated to the left eye image GL in every second group. That is, in the first write period W1 of the unit period U1 of each display period Pi, the right eye image GR and the left eye image GL are mixed together.

The eyeglass control circuit 144 of the control circuit 14 shown in FIG. 1 controls the states (an open state and a closed state) of the respective right eye shutter 22 and the left eye shutter 24 of the stereoscopic eyeglasses 20 in synchronization with the operation of the electro-optic panel 12. In detail, the eyeglass control circuit 144 performs control such that both the right eye shutter 22 and the left eye shutter 24 are in the closed states in the first write period W1 of the unit period U1 of each display period Pi, as shown in FIG. 3. In addition, the eyeglass control circuit 144 performs control such that the right eye shutter 22 is in the open state and the left eye shutter 24 is in the closed state in the second write period W2 of the unit period U1 and the unit period U2 (the first write period W1 and the second write period W2) of the right eye display period PR, and performs control such that the left eye shutter 24 is in the open state and the right eye shutter 22 is in the closed state in the second write period W2 of the unit period U1 and unit period U2 (the first write period W1 and the second write period W2) of the left eye display period PL.

Accordingly, the right eye image GR, which is displayed on the pixel section 30 in the second write period W2 of the unit period U1 and the unit period U2 of the right eye display period PR, is blocked by the left eye shutter 24 while passing through the right eye shutter 22 and reaching the right eye of the observer. Meanwhile, the left eye image GL, which is displayed on the pixel section 30 in the second write period W2 of the unit period U1 and the unit period U2 of the left eye display period PL, is blocked by the right eye shutter 22 while passing through the left eye shutter 24 and reaching the left eye of the observer. Since the right eye image GR which passed through the right eye shutter 22 is viewed using right eye and the left eye image GL which passed through the left eye shutter 24 is viewed using left eye, the observer perceives the stereoscopic effect of the display image.

As described above, in the first write period W1 of the unit period U1 of each display period Pi, the right eye image GR and the left eye image GL are mixed together. However, as described above with reference to FIG. 3, in the first write period W1 of the unit period U1 of each display period Pi, both the right eye shutter 22 and the left eye shutter 24 are maintained in the closed state, so that the mixture (crosstalk) of the right eye image GR and the left eye image GL is not perceived by the observer. That is, since the right eye image GR and the left eye image GL are reliably separated into the right eye and left eye, it is possible to make the observer perceive a definite stereoscopic effect.

In the above-described first embodiment, in the first write period W1 of the unit period U1 of each display period Pi, two scan lines 32 are selected as a unit and the grayscale potential X[n] is supplied to each of the pixels PIX. Accordingly, compared to a configuration in which, in each display period P, the scan line 32 is sequentially selected in units of a single row in every selection period H and the grayscale potential X[n] is supplied to each of the pixels PIX, the duration of the period during which the right eye image GR and the left eye image GL are mixed (that is, the period during which both the right eye shutter 22 and the left eye shutter 24 should be maintained in the closed state) is reduced. That is, the duration of the display period Pi, during which the right eye shutter 22 or the left eye shutter 24 can be maintained in the open state, is sufficiently secured. Accordingly, it is possible to improve the brightness of a display image perceived by the observer.

In the first write period W1 of the unit period U1 of each display period Pi, an image, in which the original resolution of the display image in the y direction indicated using an image signal is halved, is displayed. In the first embodiment, a grayscale potential X[n] supply target in the first write period W1 differs in the unit period U1 and the unit period U2. That is, in the unit period U1, the grayscale potential X[n] is supplied in units of a first group. However, in the unit period U2, the grayscale potential X[n] is supplied in units of a second group which is deviated from the first group by a single row. Accordingly, compared to, for example, a configuration in which the grayscale potential X[n] is supplied to every first group in both the unit period U1 and the unit period U2, the is an advantage in that it is difficult for an observer to perceive the reduction in the resolution of the display image in each unit period U.

Meanwhile, even in the case in which the designated grayscale is shared, a voltage applied to the liquid crystal element CL (the display grayscale of each of the pixels PIX) may differ when the grayscale potential X[n] is set to a positive polarity and when the grayscale potential X[n] is set to a negative polarity. When a period during which the polarity of the grayscale potential X[n] is reversed is long (for example, when a polarity is reversed in every display period Pi), there is a problem in that it is easy for the observer to perceive the variation in the display grayscale (that is, flickering) attributable to the difference in the polarity of the grayscale potential X[n]. In the first embodiment, since the polarity of the grayscale potential X[n] is reversed for a short period such as the unit period U, there is an advantage in that it is difficult to perceive the variation in the display grayscale attributable to the difference in the polarity of the grayscale potential X[n].

Figure 6:
FIG. 6 is a schematic diagram illustrating a display example used to describe the effect of the first embodiment.

A shown in FIG. 6, when each of the pixels PIX in the odd-numbered row displays the lowest grayscale (black) and each of the pixels PIX in the even-numbered row displays the highest grayscale (white), a voltage applied to the liquid crystal element CL of each of the pixels PIX is checked. A normally black mode in which a voltage is not applied to the liquid crystal element CL of each of the pixels PIX which displays the lowest grayscale (±0 V) and a voltage of ±5 V is applied to the liquid crystal element CL of each of the pixels PIX which displays the highest grayscale is exemplarily assumed.

Figure 7:
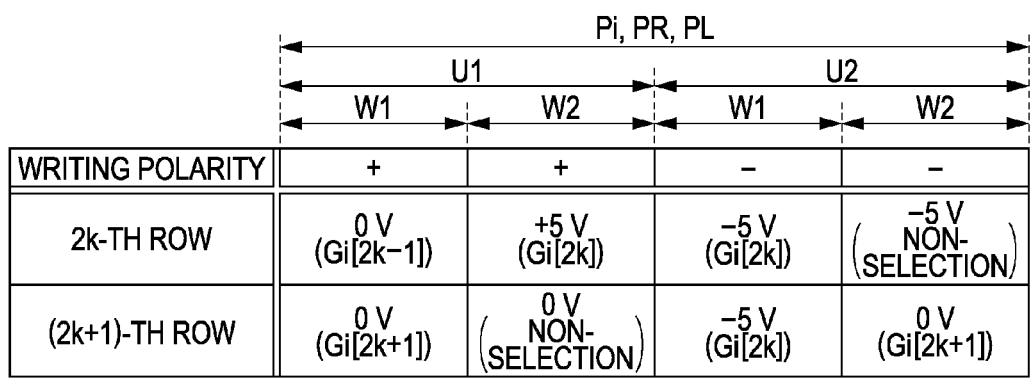
FIG. 7 is an explanatory diagram illustrating the time variation in a voltage applied to the liquid crystal element of each pixel.

FIG. 7 is an explanatory diagram illustrating a time variation in a voltage applied to the liquid crystal element CL of each of the pixels PIX in the even-numbered row (2k-th row) and the odd-numbered row ((2k+1)-th row) based on the above assumption. In the first write period W1 of the unit period U1, the grayscale potential X[n] of a positive polarity, based on the designated grayscale (the lowest grayscale) of the odd-numbered row, is supplied to each of the pixels PIX of the first group. Therefore, a voltage applied to each of the liquid crystal elements CL in the 2k-th row and the (2k+1)-th row is set to 0 V. In the second write period W2 of the unit period U1, the grayscale potential X[n] of the positive polarity, based on the designated grayscale (the highest grayscale) in the even-numbered row, is supplied to each of the pixels PIX in the even-numbered row. Therefore, a voltage of +5 V is applied to each of the liquid crystal elements CL in the 2k-th row and a voltage applied to each of the liquid crystal elements CL in non-selected (2k+1)-th row is maintained at the immediately preceding voltage (0 V).

In the first write period W1 of the unit period U2, the grayscale potential X[n] of a negative polarity, based on the designated grayscale (the highest grayscale) in the even-numbered row, is supplied to each of the pixels PIX of the second group. Therefore, a voltage applied to each of the liquid crystal elements CL in the 2k-th row and the (2k+1)-th row is set to −5 V. In addition, in the second write period W2 of the unit period U2, the grayscale potential X[n] of a negative polarity, based on the designated grayscale (the lowest grayscale) in the odd-numbered row, is supplied to each of the pixels PIX in the odd-numbered row. Therefore, a voltage applied to each of the liquid crystal elements CL in the (2k+1)-th row is set to 0 V, and a voltage applied to each of the liquid crystal elements CL in the non-selected 2k-th row is maintained at the immediately preceding voltage (−5 V).

As described above, the voltage applied to each of the liquid crystal elements CL in the 2k-th row varies in the display period Pi in such a way that 0 V→+5 V→−5 V→−5 V, and the voltage applied to each of the liquid crystal elements CL in the (2k+1)-th row varies in the display period Pi in such a way that 0 V→0 V→−5 V→0 V. That is, there is a tendency for the time that a voltage of a negative polarity is applied to each of the liquid crystal elements CL to be long in both the odd-numbered row and the even-numbered row. Accordingly, in the configuration in which the first driving is performed in the unit period U1 and the second driving is performed in the unit period U2 (hereinafter, referred to as "comparative example") in both the right eye display period PR and the left eye display period PL, a voltage applied to the liquid crystal element CL is biased against a single polarity and the deterioration in the characteristics of the liquid crystal element CL due to the application of direct current components may occur.

In the first embodiment, if it is assumed that content displayed in the right eye image GR is similar to content displayed in the left eye image GL because the relationship between the unit period U1/unit period U2 and the first driving/second driving is reversed in the right eye display period PR and the left eye display period PL, the bias of a polarity shown in FIG. 7 is offset in the right eye display period PR and the left eye display period PL. Accordingly, a special effect in that the deterioration in the characteristics of the liquid crystal element CL due to the application of direct current components is implemented.

Second Embodiment

A second embodiment of the invention will be described below. In addition, with respect to components which have equivalent operations or functions with the first embodiment in each configuration which will be illustrated below, reference numerals referred in the above description are used and the detailed description thereof will be appropriately omitted.

Figure 8:
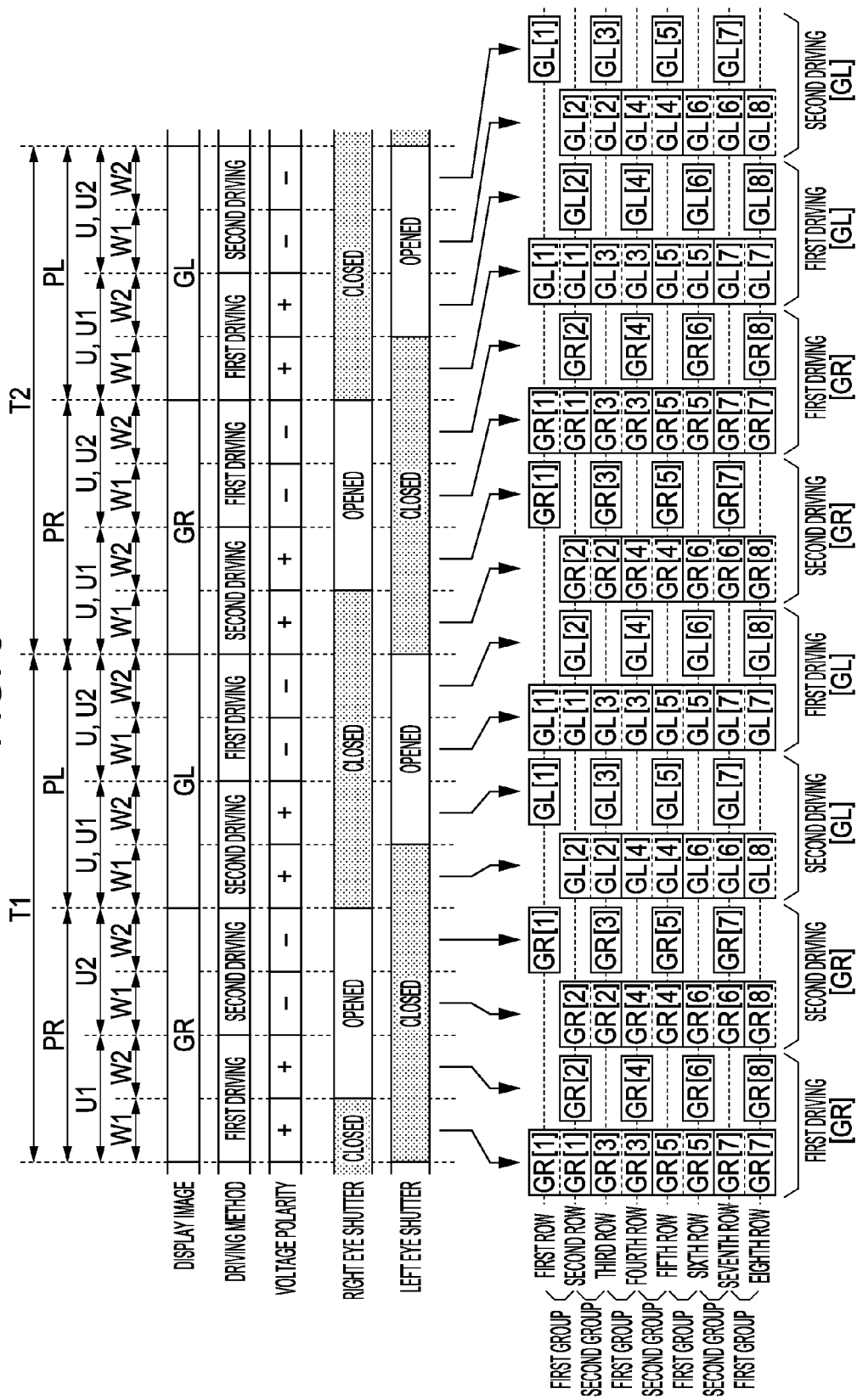
FIG. 8 is an explanatory diagram illustrating the operation of a stereoscopic display apparatus according to a second embodiment.

FIG. 8 is an explanary view illustrating the operation of the second embodiment. As shown in FIG. 8, each of a plurality of control periods T, including the right eye display period PR and the left eye display period PL which occur one after another, is divided into a control period T1 and a control period T2. The control period T1 and the control period T2 are alternately arranged on a time axis.

As understood from FIG. 8, a configuration in which the relationship between the unit period U1/the unit period U2 and the first driving/the second driving is reversed in the right eye display period PR and the left eye display period PL of the control period T is the same as in the first embodiment. The driving circuit 40 according to the second embodiment performs the first driving or the second driving in each unit period U1 such that the relationship between the unit period U1/the unit period U2 and the first driving/the second driving is reversed in the right eye display period PR of the control period T1 and the right eye display period PR of the control period T2 and in the Left eye display period PL of the control period T1 and the left eye display period PL of the control period T2.

That is, in the control period T1, the driving circuit 40 performs the first driving in the unit period U1 of the right eye display period PR and performs the second driving in the unit period U2, and the driving circuit 40 performs the second driving in the unit period U1 of the left eye display period PL, and performs the first driving in the unit period U2. Meanwhile, in the control period T2, the driving circuit 40 performs the second driving in the unit period U1 of the right eye display period PR and performs the first driving in the unit period U2, and the driving circuit 40 performs the first driving in the unit period U1 of the left eye display period PL and performs the second driving in the unit period U2.

The signal line driving circuit 44 reverses the polarity of the grayscale potential X[n] in every unit period U as the same as in the first embodiment. That is, the polarity of the grayscale potential X[n] is set to a positive polarity in the unit period U1 of each display period Pi (PR, PL) and is set to a negative polarity in the unit period U2 in both the control period T1 and the control period T2. Accordingly, in the second embodiment, the relationship between the polarity of the grayscale potential X[n] (the polarity of a voltage applied to the liquid crystal element CL) and the first driving/the second driving is reversed in the right eye display period PR of the control period T1 and in the right eye display period PR of the control period T2, and it can be said that the relationship is reversed in the left eye display period PL of the control period T1 and in the left eye display period PL of the control period T2.

The same effect as in the first embodiment is implemented in the second embodiment. In addition, in the second embodiment, since the relationship between the unit period U1/the unit period U2 of the display period Pi and the first driving/the second driving is reversed in the control period T1 and the control period T2, the bias of a polarity illustrated in FIG. 7 is offset in the control period T1 and the control period T2. Accordingly, the effect in that the deterioration in the characteristics of the liquid crystal element CL due to the application of direct current components is effectively restrained is especially remarkable.

Modification Example

Each of the above-described configurations may be variously modified. A detailed modification aspect will be exemplified below. Two or more aspects which are arbitrarily selected from the exemplification below may be appropriately merged in a mutually-consistent range.

(1) In each of the above-described configuration, when the first driving is performed, the grayscale potential X[n], based on the designated grayscale Gi[2k−1] in the odd-numbered row ((2k−1)-th row), is supplied to each of the pixels PIX of the first group in the first write period W1 and the grayscale potential X[n], based on the designated grayscale Gi[2k] in the even-numbered row (2k-th row), is supplied to each of the pixels PIX in the even-numbered row in the second write period W2, and, when the second driving is performed, the grayscale potential X[n], based on the designated grayscale Gi[2k] in the even-numbered row (2k-th row), is supplied to each of the pixels PIX of the second group in the first write period W1 and the grayscale potential X[n], based on the designated grayscale Gi[2k−1] in the odd-numbered row ((2k−1)-th row), is supplied to each of the pixels PIX in the odd-numbered row in the second write period W2. However, each of the pixels PIX (odd-numbered row/even-numbered row), to which the grayscale potential X[n] is supplied in the second write period W2, and the designated grayscale G (odd-numbered row/even-numbered row), which is reflected in the grayscale potential X[n] in each of the first write period W1 and the second write period W2, are not limited to the above-described exemplification. For example, when the first driving is performed, the grayscale potential X[n], based on the designated grayscale Gi[2k] in the even-numbered row (2k-th row), can be supplied to each of the pixels PIX of the first group in the first write period W1 and the grayscale potential X[n], based on the designated grayscale in the odd-numbered row ((2k−1)-th row), can be supplied to each of the pixels PIX in the odd-numbered row in the second write period W2. Further, when the second driving is performed, the grayscale potential X[n], based on the designated grayscale Gi[2k−1] in the odd-numbered row ((2k−1)-th row), can be supplied to each of the pixels PIX of the second group in the first write period W1 and the grayscale potential X[n], based on the designated grayscale Gi[2k] in the even-numbered row (2k-th row), can be supplied to each of the pixels PIX in the even-numbered row in the second write period W2. That is, when M scan lines 32 are divided into first scan lines 32 and second scan lines 32 which are alternately arranged, the first driving is included as an operation in which the grayscale potential X[n], based on the designated grayscale of each of the pixels PIX corresponding to the first scan lines 32, is supplied to each of the pixels PIX of the first group in the first write period W1, and the grayscale potential X[n], based on the designated grayscale of each of the pixels PIX corresponding to the second scan lines 32, is supplied to each of the pixels PIX in the second write period W2. Further, the second driving is included as an operation in which the grayscale potential X[n], based on the designated grayscale of each of the pixels PIX corresponding to the second scan lines 32, is supplied to each of the pixels PIX of the second group in the first write period W1, and the grayscale potential X[n], based on the designated grayscale of each of the pixels PIX corresponding to the first scan lines 32, is supplied to each of the pixels PIX in the second write period W2. The odd number and even number (odd-numbered row/even-numbered row) of the first scan lines 32 and the second scan lines 32 are arbitrary.

In addition, in each of the above-described configurations, the first group includes the (2k−1)-th row and the 2k-th row and the second group includes the 2k-th row and the (2k+1)-th row. However, a method of dividing the M scan line 32 is appropriately changed. For example, a configuration, in which the first group includes the 2k-th row and the (2k+1)-th row and the second group, includes the (2k−1)-th row and the 2k-th row can be used. Accordingly, the grayscale potential X[n], based on the designated grayscale Gi[2k] in the even-numbered row (2k-th row), can be supplied to each of the pixels PIX of the first group in the first write period W1 of the unit period U1, and the grayscale potential X[n], based on the designated grayscale Gi[2k+1] in the odd-numbered row ((2k+1)-th row), can be supplied to each of the pixels PIX in the odd-numbered row in the second write period W2. Further, the grayscale potential X[n], based on the designated grayscale Gi[2k−1] in the odd-numbered row ((2k−1)-th row), can be supplied to each of the pixels PIX of the second group in the first write period W1 of the unit period U2, and the grayscale potential X[n], based on the designated grayscale Gi[2k] in the even-numbered row (2k-th row), can be supplied to each of the pixels PIX in the even-numbered row in the second write period W2.

(2) In each of the above-described configurations, when the second driving is performed, the case in which the grayscale potential X[n] is not supplied to each of the pixels PIX in the first row in the first write period W1 has been exemplified for descriptive purpose. However, the grayscale potential X[n], based on the designated grayscale Gi[1] in the corresponding row, or the grayscale potential X[n], based on a predetermined grayscale (for example, a black grayscale or an intermediate grayscale), can be supplied to each of the pixels PIX in the first row.

(3) In each of the above-described configurations, the right eye shutter 22 is changed from the closed state to the open state at the end point of the first write period W1 of the unit period U1 of the right eye display period PR. However, the period of changing the right eye shutter 22 from the closed state to the open state may be appropriately changed. For example, in a configuration in which the right eye shutter 22 is changed to the open state before the end point of the first write period W1 of the unit period U1 of the right eye display period PR, the mixture of the right eye image GR and the left eye image GL in the first write period W1 is slightly perceived by an observer. However, it is possible to improve the brightness of the display image. Meanwhile, in a configuration in which the right eye shutter 22 is changed to the open state at the time point after the end point of the first write period W1 of the unit period U1 of the right eye display period PR, the brightness of the display image is lowered. However, it is possible to reliably prevent an observer from perceiving the mixture of the right eye image GR and the left eye image GL. Likewise, configurations may be used in which setting is made such that the period of changing the right eye shutter 22 from the open state to the closed state is previous to the end point of the second write period W2 of the unit period U2 of the right eye display period PR (although the brightness of the display image is lowered, the mixture of the right eye image GR and the left eye image GL is prevented), and in which setting is made such that the period of changing the right eye shutter 22 from the open state to the closed state is after the end point of the second write period W2 of the unit period U2 of the right eye display period PR (although the mixture of the right eye image GR and the left eye image GL is slightly perceived in the unit period U1 of the left eye display period PL, the brightness of the display image is improved). In addition, the opening and closing period, during which it is difficult for an observer to perceive the mixture of the right eye image GR and the left eye image GL, depends on the relationship between the response characteristic of the right eye shutter 22 and the left eye shutter 24 and the response characteristic of the electro-optic panel 12 (liquid crystal element CL). Accordingly, the period of changing the right eye shutter 22 from the closed state to the open state and the period of changing the right eye shutter 22 from the open state to the closed state are selected in consideration of various types of causes, such as the priority (balance) of the prevention of perception of the mixture of the right eye image GR and the left eye image GL performed by an observer and the reliability of the brightness of the display image, and the relationship between the response characteristic of the stereoscopic eyeglasses 20 and the response characteristic of the electro-optic panel 12. In addition, although the right eye shutter 22 has been mentioned in the above description, the same circumstance is applied to the period of opening and closing the left eye shutter 24.

As understood from the above description, the period during which control is performed such that the right eye shutter 22 is in the open state, is included as a period which includes at least a part of the second write period W2 of the unit period U1 and the unit period U2 of the right eye display period PR (regardless whether a part of the first write period W1 of the unit period U1 is included). Likewise, the period during which control is performed such that the left eye shutter 24 is in the open state is included as a period which includes a part of the second write period W2 of the unit period U1 and the unit period U2 of the left eye display period PL. In addition, a period during which control is performed such that both the right eye shutter 22 and the left eye shutter 24 are in the closed state is included as a period which includes at least a part of the first write period W1 of the unit period U1 of each display period Pi (PR, PL).

(4) The number of scan lines 32 included in the first group or the second group is not limited to two scan lines. That is, the first group and the second group are included as sets each of which is obtained by dividing the M scan lines 32 into Q scan lines which are adjacent to each other (Q is a natural number which is equal to or greater than 2) using a different combination. When the first group and the second group are generalized as the sets of Q scan lines 32, each of the unit period U1 and the unit period U2 includes Q write periods W1 to WQ. The first driving is included as an operation of sequentially selecting each first group in every selection period H of the initial write period W1 of the unit period U, supplying the grayscale potential X[n], based on the designated grayscale of each of the pixels PIX corresponding to the first scan line 32 of the first group in the selection state, to each of the signal lines 34, and supplying the grayscale potential X[n], based on the designated grayscale of each of the pixels PIX corresponding to the q-th scan line 32 of the Q scan lines 32 of the first group, to each of the signal lines 34 in each of the write period W2 to WQ of the unit period U. Likewise, the second driving is included as an operation of sequentially selecting each second group in every selection period H of the initial write period W1 of the unit period U, supplying the grayscale potential X[n], based on the designated grayscale of each of the pixels PIX corresponding to the first scan line 32 of the second group in the selection state, to each of the signal lines 34, and supplying the grayscale potential X[n], based on the designated grayscale of each of the pixels PIX corresponding to the q-th scan line 32 of the Q scan lines 32 of the second group, to each of the signal lines 34 in each of the write period W2 to WQ of the unit period U.

(5) In the first embodiment, the configuration (hereinafter, referred to as "configuration A") is exemplified in which the relationship between the unit period U1/the unit period U2 (the positive polarity/negative polarity of the grayscale potential X) and the first driving/the second driving is reversed in the right eye display period PR and the left eye display period PL. In the second embodiment, a configuration is exemplified to which the configuration (hereinafter, referred to as "configuration B") in which the relationship between the unit period U1/the unit period U2 and the first driving/the second driving is reversed in the control period T1 and the control period T2 is added in the first embodiment. However, the configuration A is not a required condition for the configuration B, and configuration B can be implemented alone. That is, a configuration in which the relationship between the unit period U1/the unit period U2 and the first driving/the second driving is commonly used in the right eye display period PR and the left eye display period PL of the control period T and in which the relationship is reversed in the control period T1 and the control period T2 may be used. For example, in the right eye display period PR and the left eye display period PL of the control period T1, the first driving is performed in the unit period U1 and the second driving is performed in the unit period U2. Further, in the right eye display period PR and the left eye display period PL of the control period T2, the second driving is performed in the unit period U1 and the first driving is performed in the unit period U2.

(6) The electro-optic element is not limited to the liquid crystal element CL. For example, an electrophoretic element can be used as the electro-optic element. That is, the electric potential optical element is included as a display element in which the optical characteristics (for example, transmittance) thereof vary according to an electrical operation (for example, application of a voltage).

Application Example

Figure 9:
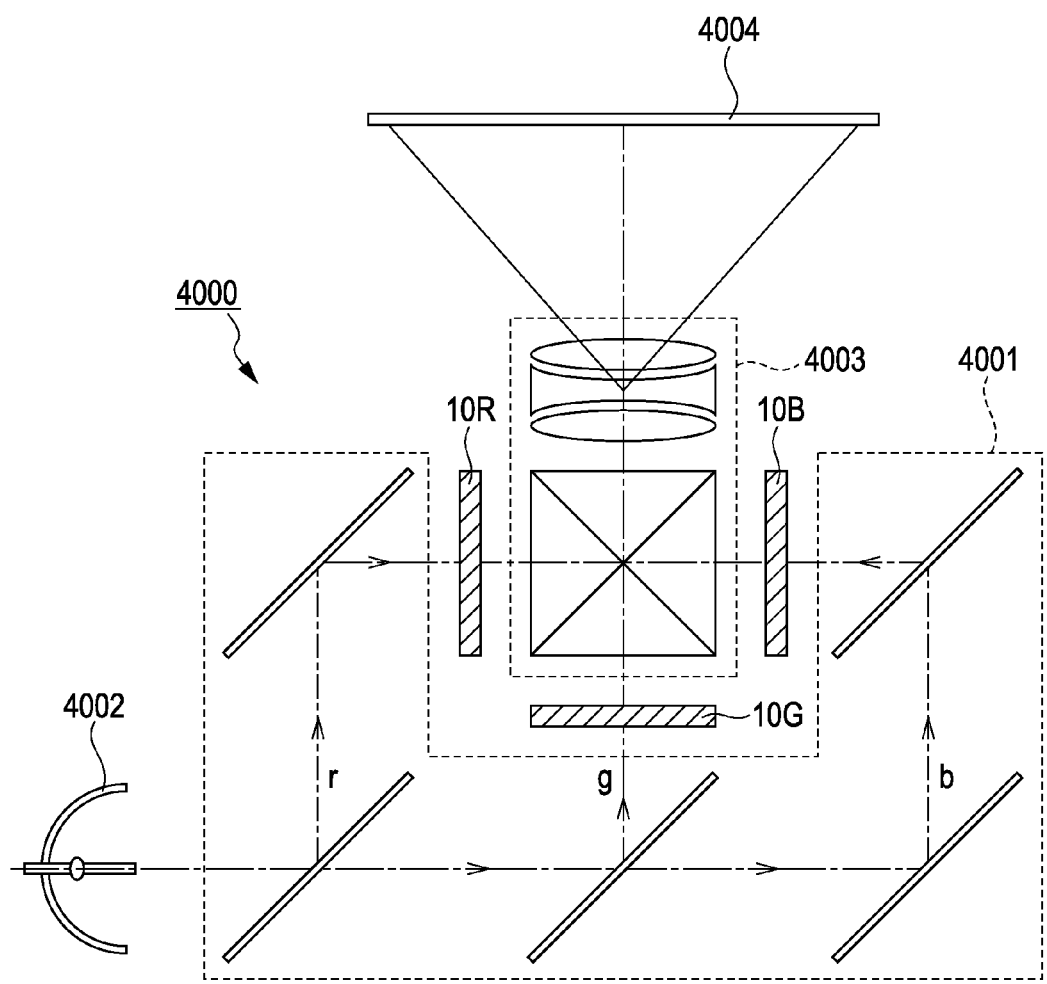
FIG. 9 is a perspective view illustrating an electronic apparatus (a projection-type display apparatus).
Figure 10:
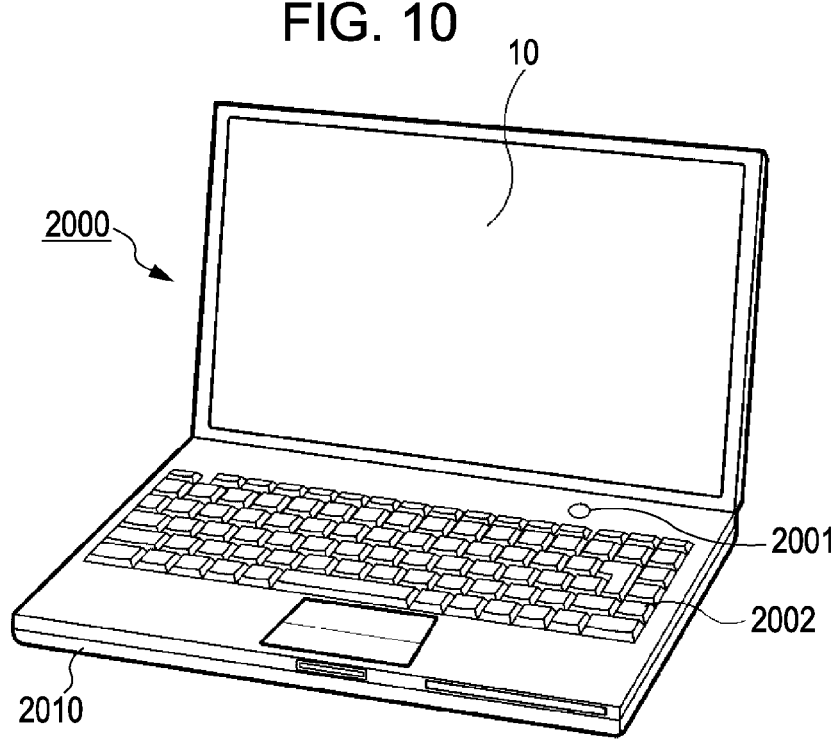
FIG. 10 is a perspective view illustrating an electronic apparatus (a personal computer).
Figure 11:
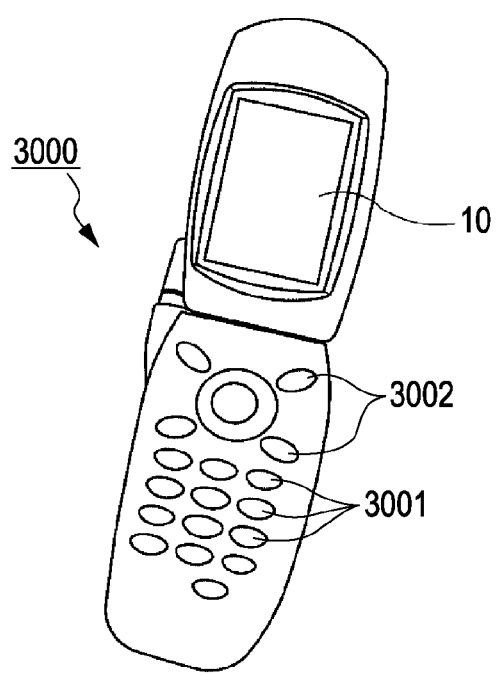
FIG. 11 is a perspective view illustrating an electronic apparatus (a mobile phone).
Figure 12:
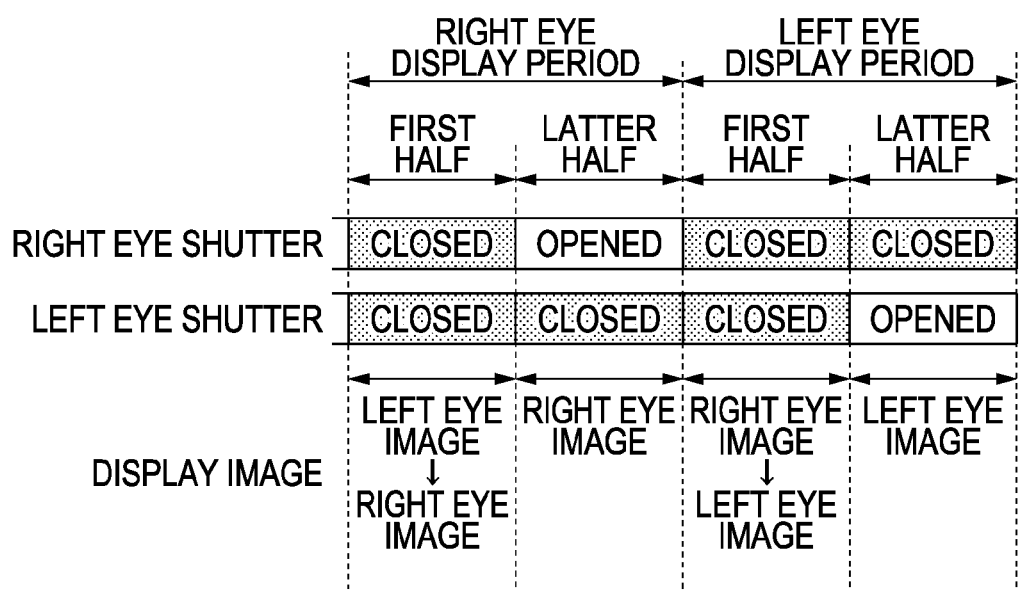
FIG. 12 is an explanatory diagram illustrating a stereoscopic operation according to the related art.

The electro-optic apparatus 10 illustrated in each of the above embodiments may be used as various types of electronic apparatuses. In FIGS. 9 to 11, the detailed form of an electronic apparatus which uses the electro-optic apparatus 10 is illustrated.

FIG. 9 is a perspective view illustrating a projection-type display apparatus (three panel projector) 4000 to which the electro-optic apparatus 10 is applied. The projection-type display apparatus 4000 includes three electro-optic devices 10 (10R, 10G, and 10B) corresponding to different display colors (red, green, and blue). An illuminating optical system 4001 supplies the red color component r of light emitted from the illumination apparatus (light source) 4002 to the electro-optic apparatus 10R, supplies the green component g to the electro-optic apparatus 10G, and supplies the blue component b to the electro-optic apparatus 10B. Each electro-optic apparatus 10 functions as a light modulator (light valve) which modulates monochromatic light, supplied from the illuminating optical system 4001, according to the display image. The optical projection system 4003 synthesizes light emitted from each electro-optic apparatus 10 and projects the resulting light upon a projection surface 4004. An observer views a stereoscopic image projected upon the projection surface 4004 using stereoscopic eyeglasses 20 (not shown in FIG. 9).

FIG. 10 is a perspective view illustrating a portable personal computer which uses the electro-optic apparatus 10. A personal computer 2000 includes an electro-optic device 10 which displays various types of images and a main body section 2010 provided with a power switch 2001 and a keyboard 2002.

FIG. 11 is a perspective view illustrating a mobile phone to which the electro-optic apparatus 10 is applied. A mobile phone 3000 includes a plurality of operational buttons 3001 and scroll buttons 3002, and an electro-optic apparatus 10 which displays various types of images. When the scroll buttons 3002 are operated, an image displayed on the electro-optic apparatus 10 is scrolled.

Further, in addition to the apparatuses illustrated in FIGS. 9 to 11, a Personal Digital Assistant (PDA), a digital still camera, a television, a video camera, a car navigation apparatus, a vehicle display apparatus (an instrument panel), an electronic organizer, electronic paper, an electronic calculator, a word processor, a workstation, a video phone, a Point-of-Sale (POS) terminal, a printer, a scanner, a copy machine, a video player, or an apparatus having a touch panel may be used as an electronic apparatus to which the electro-optic apparatus according to the invention is applied.

What is claimed is:

1. An electro-optic apparatus which displays a right eye image and a left eye image, the electro-optic apparatus comprising:
   a plurality of scan lines in which first scan lines and second scan lines are alternately arranged;
   a plurality of signal lines which intersect the plurality of scan lines;
   a plurality of pixels which are arranged to correspond to intersections of the plurality of scan lines and the plurality of signal lines; and
   a driving circuit which selects each of the plurality of pixels,
   wherein the driving circuit performs a first driving in which, in a first write period of the first driving, a plurality of first groups obtained by dividing the plurality of scan lines into groups of two scan lines which are adjacent to each other are sequentially selected, and a grayscale potential based on a designated grayscale of each of the pixels corresponding to a first scan line of the first groups in a selection state is supplied to each of the signal lines, and, in a second write period of the first driving after the first write period of the first driving has elapsed, each of second scan lines is sequentially selected, and a grayscale potential based on a designated grayscale of each of the pixels corresponding to each of the second scan lines in the selection state is supplied to each of the signal lines,
   wherein the driving circuit performs a second driving in which, in a first write period of the second driving, a plurality of second groups obtained by dividing the plurality of scan lines into groups of two scan lines which are adjacent to each other using different combination from that of the first groups are sequentially selected, and a grayscale potential based on a designated grayscale of each of the pixels corresponding to a second scan line of the second groups in the selection state is supplied to each of the signal lines, and, in a second write period of the second driving, each of first scan lines is sequentially selected, and a grayscale potential based on a designated grayscale of each of the pixels corresponding to each of the first scan lines in the selection state is supplied to each of the signal lines, and
   wherein the driving circuit performs the first driving in a first unit period for displaying the right eye image, performs the second driving in a second unit period, after the first unit period for displaying the right eye image has elapsed, for displaying the right eye image, performs the first driving in a first unit period for displaying the left eye image, and performs the second driving in a second unit period, after the first unit period for displaying the left eye image has elapsed, for displaying the left eye image.

2. The electro-optic apparatus according to claim 1, wherein the driving circuit sets a polarity of the grayscale potential with respect to a reference potential to a first polarity in the first write period and the second write period of the first unit period, and sets the polarity of the grayscale potential with respect to the reference potential to a second polarity which is reverse to the first polarity in the first write period and the second write period of the second unit period.

3. The electro-optic apparatus according to claim 1, wherein the driving circuit performs the first driving in the first unit period for displaying the right eye image and performs the second driving in a second unit period, after the first unit period for displaying the right eye image has elapsed, for displaying the right eye image, and performs the second driving in the first unit period for displaying the left eye image and performs the first driving in a second unit period, after the first unit period for displaying the left eye image has elapsed.

4. The electro-optic apparatus according to claim 1, further comprising:
   stereoscopic eyeglasses which includes a right eye shutter and a left eye shutter and displays the right eye image and the left eye image which are stereoscopically viewed; and
   an eyeglass control circuit which performs control such that both the right eye shutter and the left eye shutter are in a closed state in at least a part of the first write period of the first unit period, performs control such that the right eye shutter is in an open state and the left eye shutter is in the closed state in at least a part of the second write period of the first unit period for displaying the right eye image and the first write period and the second write period of the second unit period, and performs control such that the left eye shutter is in the open state and the right eye shutter is in the closed state in at least a part of the second write period of the first unit period for displaying the left eye image and the first write period and the second write period of the second unit period.

5. An electronic apparatus comprising the electro-optic apparatus according to claim 1.

6. An electro-optic apparatus which displays a right eye image and a left eye image, the electro-optic apparatus comprising:
   a plurality of scan lines in which first scan lines and second scan lines are alternately arranged;
   a plurality of signal lines which intersect the plurality of scan lines;
   a plurality of pixels which are arranged to correspond to intersections of the plurality of scan lines and the plurality of signal lines; and
   a driving circuit which selects each of the plurality of pixels,
   wherein the driving circuit performs a first driving in which, in a first write period of the first driving, a plurality of first groups obtained by dividing the plurality of scan lines into groups of two scan lines which are adjacent to each other are sequentially selected, and a grayscale potential based on a designated grayscale of each of the pixels corresponding to a first scan line of the first groups in a selection state is supplied to each of the signal lines, and, in a second write period of the first driving after the first write period of the first driving has elapsed, each of second scan lines are sequentially selected, and a grayscale potential based on a designated grayscale of each of the pixels corresponding to each of the second scan lines in the selection state is supplied to each of the signal lines,
   wherein the driving circuit performs a second driving in which, in a first write period of the second driving, a plurality of second groups obtained by dividing the plurality of scan lines into groups of two scan lines which are adjacent to each other using different combination from that of the first groups is sequentially selected, and a grayscale potential based on a designated grayscale of each of the pixels corresponding to a second scan line of the second groups in the selection state is supplied to each of the signal lines, and, in a second write period of the second driving, each of first scan lines is sequentially selected, and a grayscale potential based on a designated grayscale of each of the pixels corresponding to each of the first scan lines in the selection state is supplied to each of the signal lines, and
   wherein the driving circuit performs the first driving in a first unit period for displaying a first right eye image, performs the second driving in a second unit period, after the first unit period for displaying the first right eye image has elapsed, for displaying the first right eye image, performs the second driving in a first unit period for displaying a second right eye image after the first right eye image and a left eye image, and performs the first driving in a second unit period for displaying the second right eye image.

7. An electro-optic apparatus which displays a right eye image and a left eye image, the electro-optic apparatus comprising:
   a plurality of scan lines;
   a plurality of signal lines which intersect the plurality of scan lines;
   a plurality of pixels which are arranged to correspond to intersections of the plurality of scan lines and the plurality of signal lines; and
   a driving circuit which drives each of the plurality of pixels,
   wherein the driving circuit performs first driving in which, in a first write period, a plurality of first groups obtained by dividing the plurality of scan lines into groups of Q scan lines which are adjacent to each other where Q is a natural number which is equal to or greater than 2 is sequentially selected, and a grayscale potential based on a designated grayscale of each of the pixels corresponding to a first scan line of the first groups in a selection state is supplied to each of the signal lines, and, in each q-th write period where q=2 to Q, after the first write period has elapsed, the grayscale potential, based on the designated grayscale of each of the pixels corresponding to a q-th scan line of each first groups, is supplied to each of the signal lines,
   wherein the driving circuit performs second driving in which, in the first write period, a plurality of second groups obtained by dividing the plurality of scan lines into groups of Q scan lines which are adjacent to each other using combination which is different from that of the first groups are sequentially selected, and a grayscale potential, based on a designated grayscale of each of the pixels corresponding to a first scan line of the second groups in the selection state, is supplied to each of the signal lines, and, in each q-th write period, the grayscale potential, based on the designated grayscale of each of the pixels corresponding to a q-th scan line of each second group, is supplied to each of the signal lines, and
   wherein the driving circuit performs the first driving in a first unit period for displaying a first right eye image, performs the second driving in the second unit period, after the first unit period has elapsed, for displaying the first right eye image, performs the second driving in a first unit period for displaying a second right eye image after the first right eye image and a left eye image, and performs the first driving in a second unit period for displaying the second right eye image.

8. An electro-optic apparatus which displays a right eye image and a left eye image, the electro-optic apparatus comprising:
   a plurality of scan lines;
   a plurality of signal lines which intersect the plurality of scan lines;
   a plurality of pixels which are arranged to correspond to intersections of the plurality of scan lines and the plurality of signal lines; and
   a driving circuit which drives each of the plurality of pixels,
   wherein the driving circuit performs first driving in which, in a first write period, a plurality of first groups obtained by dividing the plurality of scan lines into groups of Q scan lines which are adjacent to each other, where Q is a natural number which is equal to or greater than 2, are sequentially selected, and a grayscale potential based on a designated grayscale of each of the pixels corresponding to a first scan line of the first group in a selection state is supplied to each of the signal lines, and, in each q-th write period, where q=2 to Q, after the first write period has elapsed, the grayscale potential, based on the designated grayscale of each of the pixels corresponding to a q-th scan line of each first group, is supplied to each of the signal lines,
   wherein the driving circuit performs second driving in which, in the first write period, a plurality of second groups obtained by dividing the plurality of scan lines into groups of Q scan lines which are adjacent to each other using combination which is different from that of the first group is sequentially selected, and a grayscale potential, based on a designated grayscale of each of the pixels corresponding to a first scan line of the second group in the selection state, is supplied to each of the signal lines, and, in each q-th write period, the grayscale potential, based on the designated grayscale of each of the pixels corresponding to a q-th scan line of each second group, is supplied to each of the signal lines, and wherein the driving circuit performs the first driving in a first unit period for displaying the right eye image, performs the second driving in the second unit period, after the first unit period has elapsed, for displaying the right eye image, performs the first driving in the first unit period for displaying a left eye image after the right eye image, and performs the second driving in the second unit period for displaying the left eye image.

* * * * *